United States Patent [19]

Szcupak

[11] Patent Number: 4,508,020

[45] Date of Patent: Apr. 2, 1985

[54] MULTI-FUNCTION FLUID SEAL FOR DAMPERS AND THE LIKE

[75] Inventor: Peter Szcupak, Park Ridge, Ill.

[73] Assignee: Chicago Rawhide Manufacturing Company, Elgin, Ill.

[21] Appl. No.: 467,597

[22] Filed: Feb. 18, 1983

[51] Int. Cl.³ .............................................. F16J 15/18
[52] U.S. Cl. ................................. 92/168; 188/322.17; 277/27; 277/153
[58] Field of Search ................... 277/27, 84, 152, 153; 92/168 R; 188/322.17, 322.21; 267/64.28

[56] References Cited

U.S. PATENT DOCUMENTS

| | | | |
|---|---|---|---|
| 3,612,547 | 10/1971 | Kan | 277/153 |
| 4,055,352 | 10/1977 | Allinquant et al. | 277/152 |
| 4,106,781 | 8/1978 | Benjamin et al. | 277/152 |
| 4,278,261 | 7/1981 | Miura et al. | 277/153 |
| 4,342,447 | 8/1982 | Mary | 277/27 |

FOREIGN PATENT DOCUMENTS 2045892  11/1980  United Kingdom ........... 188/322.17

Primary Examiner—Paul E. Maslousky
Attorney, Agent, or Firm—James T. FitzGibbon

[57] ABSTRACT

A seal unit having a casing portion and an elastomeric seal body bonded thereto, with the seal body including an excluder lip, a primary liquid seal lip and a separate gas or vapor sealing lip. The primary and secondary lips insure against leakage in both the static and dynamic conditions of the seal. While gas or vapor sealing lip is seated against the valve body of an associated mechanism. The gas or vapor lip in effect provides a relief valve action and is able to be urged into a position of engagement with another part of an associated machine member by its own inherent resiliency. The relief valve bleeds gas and liquid in one direction but not in the opposite direction.

9 Claims, 5 Drawing Figures

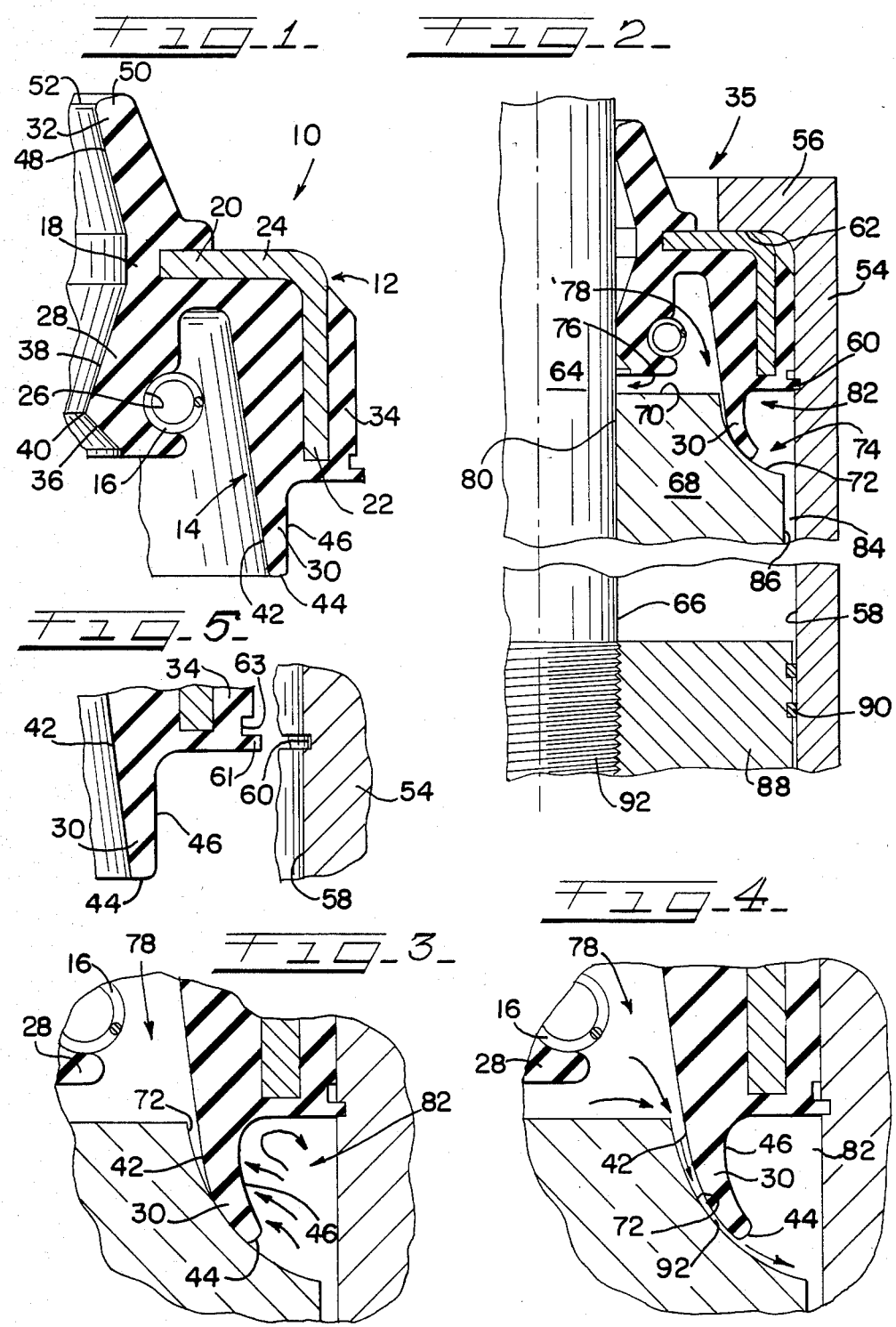

MULTI-FUNCTION FLUID SEAL FOR DAMPERS AND THE LIKE

The present invention relates generally to fluid seals, and more particularly, to multi-function specialty seals used in motion control dampers and the like.

In recent years, there has been an increase in activity in the development of movement control dampers, commonly called "shock absorbers" or sometimes merely "shocks", used as portions of vehicle suspension components and otherwise.

There has been considerable improvement in the size and capacity of such units, with many such dampers having a number of internal control devices adapted to provide excellent damping and rebound control, often having variable rate and other sophisticated features which permit highly improved performance. However, as with all movement dampers, including those provided in a unitized package with an associated spring, such as so-called McPherson Struts, there has been a continuing problem of meeting various difficult sealing requirements.

Thus, a so-called shock absorber seal is required to exclude contaminants from the exterior of the housing. This requirement is often fairly severe, insasmuch as the shock or damper must be exposed to road conditions over a period of many years. The damper is exposed to grit, sand dirt, water, and extremes of temperature. In addition, the seal must permit axial movement of a rod or the like therethrough to provide a thin film of lubricant on the seal surfaces, as well as providing confinement of liquid to regions within the shock body. This in turn calls for reliable sealing action, particularly in view of the high pressures encountered and the large number of operating cycles through which such a shock or damper is required to perform during its life.

Still further, with modern dampers, it is customary to provide a gas retaining portion as well as a fluid retaining portion. In this connection, it will be understood that as the damping fluid moves through control orifices from one side of the piston to the other within the cylinder to provide damping action, the fluid displaced from one side of the piston must be accommodated on the other side thereof. Inasmuch as the piston is operated by a rod, extending out one end of the unit, the rod end of the piston provides more displacement than the open or non-rod end. In other words, when the damper is fully compressed, its overall interior volume is less than when it is fully extended, inasmuch as the rod to which the piston is attached has moved fully into the interior of the assembly as a whole, and occupies a certain volume.

In view of the incompressible nature of the damping fluid, this volume change, which occurs to a greater or less extent with every stroke, is accommodated by the provision of a gas or vapor which is highly compressible relative to the fluid. In some designs, the gas is kept separate by a piston, bag or bladder and stop within its own internal area; in another design, the damper operates with the fluid in emulsion form. In either case, at maximum compression, the volume of the fluid is substantially diminished while the gas undergoes compression. Where emulsion occurs, after the unit is permitted to achieve a static position, the gases theretofore dissolved or emulsified are released or demulsified from the oil. Consequently, in a sealing application for a movement control damper, it is necessary to provide a static seal for gas, usually providing such seal from the gas reserve cavity to the outside, along a path separate from that along which the seal against fluid leakage is provided.

According to the present invention, it is desired to provide a new and improved seal for movement control assemblies, and specifically a seal which provides good dirt exclusion, good fluid retention and gas retention in both the static and dynamic conditions. It is further desired to provide a seal wherein the existence of gas pressure under working conditions does not adversely affect the radial load of the seal so as either to permit leakage or to cause undue wear.

In view of the heretofore unsatisfied need for a seal of the type just desribed, it is an object of the present invention to provide an improved fluid seal for gas or vapor and liquid co-existing in the same sealed mechanism.

Another object of the invention is to provide a fluid seal which will seal low viscosity fluids such as gases and vapors, as well as liquids such as synthetic oils, mineral oils, and the like.

Another object of the invention is to provide a seal which will provide lubrication of a shaft moved axially therethrough without permitting undue leakage.

A still further object of the invention is to provide an improved fluid seal which provides one or more lips for excluding dirt from the interior of the sealed region, and which also serve as a wiper lip for the rod forming a part of the movement control assembly.

An even further object of the invention is to provide a seal design wherein the seal body itself serves both as the gas seal body and the vapor seal body, using different surfaces of the same body to achieve the desired sealing effect.

Another object of the invention is to provide a seal design wherein both gas or vapor and liquid seals are provided by a single element.

A further object of the invention is to provide a fluid seal having a single elastomeric body and providing at least three engagement or seal band surfaces.

A still further object of the invention is to provide a fluid seal which may be manufactured by existing techniques without specialized equipment and which seal may be readily removed from the mold after manufacture.

An even further object of the invention is to provide, in one embodiment, a fluid seal wherein two separate gas or vapor seals are provided so that gas leakage in the second sealed region will not adversely affect the overall performance of the seal.

Another object of the invention is to provide a composite oil seal having a stiffening or mounting portion which is of simple, easy-to-install cross-section.

A still further object of the invention is to provide a fluid seal which includes a seal lip to resist vapor or gas leakage and another adapted to engage the primary sealing surface, namely, a reciprocable rod extending through the unit.

A further object of the invention is to provide a unit wherein the casing permits simplified mounting and reliable installation in use.

Yet another object of the invention is to provide a fluid seal which will permit gas or vapor flow in one direction only from a first sealed region to a second sealed region, but which will prevent fluid flow in a reverse direction between these regions.

The foregoing and other objects and advantages of the invention are achieved in practice by providing a composite seal member which includes a casing portion and an elastomeric seal body bonded thereto with the seal body providing an excluder lip, a primary liquid seal lip and a gas or vapor sealing lip, each forming a part of the primary seal body and adapted to insure against leakage in both the static and dynamic conditions of the seal, with the gas or vapor sealing lip being formed integrally with the body from which the primary liquid seal lip is formed, and is able to be urged into a position of engagement with another part of an associated machine member by its own inherent resiliency to provide a valve action.

The exact manner in which the foregoing and other objects and advantages of the invention are achieved in practice will become more clear when reference is made to the following detailed description of the preferred embodiments of the invention set forth by way of example and shown in the accompanying drawings, wherein like reference numbers indicate corresponding parts throughout.

BRIEF DESCRIPTION OF THE DRAWINGS

FIG. 1 is a fragmentary vertical sectional view, on an enlarged scale, showing a preferred form of seal made according to the invention, with the seal in its relaxed or "as formed" condition;

FIG. 2 is a fragmentary vertical sectional view, on a reduced scale, showing the seal as installed in a hydraulic movement control damper or the like, and showing two sealed regions, as well as other portions of the sealed mechanism and a region exterior thereto;

FIG. 3 is a further enlarged fragmentary sectional view of the seal of FIG. 2, in the installed position, showing the gas seal being effected under static conditions;

FIG. 4 shows the installed seal of FIG. 3, except that liquid passage through the gas or valve type seal is shown;

FIG. 5 shows the locating bead on the seal body and the cooperating groove in the damper body.

DESCRIPTION OF THE PREFERRED EMBODIMENTS OF THE INVENTION

While the invention is not intended to be limited to any particular application or to seal any particular type of mechanism, the description herein given is one of a motion control damper having a control piston with a damper rod attached thereto, moving reciprocally within a housing which includes one or more fluid flow control valves and wherein the sealed media include both an oil such as a mineral oil and a gas or vapor, such as nitrogen or a fluorocarbon ("Freon").

Referring now to the drawings in greater detail, FIG. 1 shows a seal assembly generally designated 10 and shown to include a stiffener or seal casing generally designated 12, an elastomeric seal body generally designated 14, and a radially acting garter spring unit 16. The elastomeric seal body 14, which is conventionally made of a synthetic elastomer, includes a bonding portion 18 which surrounds a radially inwardly extending portion 20 of the casing 12, and which is bonded securely thereto during manufacture in a known manner. The casing 12, customarily made from metal, is shown to include a radially outermost or mounting flange portion 22, and a radial flange 24, having as its radial part the innermost bonding portion 20 just referred to. While steel is a preferred material from which the casing 12 or the like is made, it may be also made of other metals or other relatively rigid materials to which an elastomer may be fastened, as by bonding or otherwise.

The elastomeric body portion 14 is shown to include a number of principal components, including a groove 26 for locating the spring 16, a radially acting primary liquid lip body portion 28 adapted to provide a seal for a first sealed region, an axially extending, radially displaceable gas or vapor lip body 30 adapted to provide a unique sealing and valve action for a second sealed region, and a so-called dirt or excluder lip body 32. The seal body as a whole also includes a cylindrical rubber sleeve 34, forming the outside diameter or "OD" of the seal 10.

As will be further seen by reference to FIG. 1, the elastomeric liquid lip body 28 includes a so-called oil side frusto-conical surface 36 and an air side frusto-conical surface 38 which meet along a generally circular locus to form a primary seal band 40. The vapor lip body 30 is defined in part by a nearly cylindrical, slightly tapering inner surface 42, radially extending end face annular surface 44, and a generally cylindrical outer surface 46.

Referring now to the excluder lip body 32, it will be noted that this body is defined in part by a frusto-conical surface 48 having a taper opposite to that of the surface 38, and that this surface 48 meets a generally radially directed annular surface 50 with these surfaces 48, 50 cooperating to form an excluder lip having an annular seal band area 52 and functioning in a known manner to exclude contaminants from the sealed region.

Referring now to FIG. 2, details of the sealed mechanism and the seal 10 in its installed position are shown. Assuming the application to be a motion damper or "shock absorber" generally designated 35, one end thereof is seen to include an outer cylindrical shell 54, terminating in a radially inwardly directed end flange 56. The shell has an inner cylindrical wall surface 58 with a seal positioning groove 60 and an inner end wall surface 62.

Another portion of the sealed mechanism 35 includes a reciprocable rod 64 having a cylindrical, radially outwardly directed surface 66. A portion of the shock absorber mechanism 35 also includes a valve body 68 which is also cylindrical and lies between the surface 58 and the outer surface 66 of the rod 64. This body 68 includes an outer end wall 70, a radiused or rounded groove 72 acting as a seat 74. A radial passage generally designated 76 is defined between the end wall 70 and the oil side of the seal 10; this passage 76 will permit fluid flow, as will appear.

In FIG. 2, the primary sealed region is shown as 78 and includes the portion lying between the innermost cylindrical surface 80 of the valve body 68 and the outer surface 66 of the rod 64. The second sealed region is designated 82 and includes a second passage 84 lying between an outer surface 86 of the valve body 68 and the inner surface 58 of the shell 54.

A sealed mechanism 35, in a typical form, also includes a piston 88 having piston rings 90 and being attached at its inner diameter to a threaded end portion 92 of the rod 64.

Referring now to FIGS. 3 and 4, which are enlarged with respect to FIGS. 1 and 2, the one-way "valve" or pressure relief aspect of the seal is illustrated.

In FIG. 3, it is shown that the vapor lip body 30 has its radially inwardly directed surface 42 urged against the surface defining the groove 72, not only by the inherent hoop strength of the lip body 30, but also by fluid forces lying in the second sealed region 82, which forces are illustrated by the arrows in FIG. 3. Thus, in this condition, forces acting radially inwardly, and comprising vapor or gas for example, are sealed within the second region 82, particularly when the pressure in this cavity exceeds that in the first sealed region 78. Forces in the region 82 act principally on the exposed surface 46 of the vapor lip 30, and also on the end surface 44 of the vapor lip body 30, to urge it radially inwardly and into snug sealing engagement with the contoured surface of the groove 72.

FIG. 4 shows the seal in another operative mode, wherein pressure in the first region 78 exceeds that in the second region 82. In this case, the hoop strength of the body 30, combined with the pressure, if any, acting on the radially outer surfaces of the body 30 is insufficient to cause the surface 42 of the body 30 to remain on its seat 72. In this instance, fluid or fluid and vapor pass as shown by the arrows in the small vent or one-way passage 92 lying between the surfaces 42 and 72. This one-way valve action lifts the vapor lip body 30 somewhat radially outwardly, forming the surface 46 into a somewhat rounded or curled shape; it is urged against this deformation by its own inherent resiliency to revert to the "as-molded" shape shown in FIG. 1. Thus, the combination of radially inwardly acting forces in the second chamber 82 and the elasticity and hoop strength of the lip body 30 tend to bias the valve closed, as does the pre-load placed on the body 30 by moving the lip 30 axially during installation so that the end face 44 thereof moves radially outwardly, as is further described herein.

These forces are overcome from time to time during operation by a predetermined pressure level, creating the action illustrated in FIG. 4. In use, when the design pressure in the cavity 78 is sufficiently greater than the pressure in cavity 82, the unseating force required for this valve action is created.

An important feature of the invention is that, in use, the pressure in the cavity 82 is normally accounted for by vapor, gas, or emulsion vapor pressure, and this force tightly seats the vapor seal lip body such that no vapor or gas leakage occurs even over long periods of inaction on the part of the sealed mechanism. In other words, in automotive applications, such as MacPherson Structs, the sealed mechanism 35 is called upon to undergo moderate and in some cases, severe action as the auto is driven, perhaps over rough roads or at high speeds, causing a variety of reciprocating motions of the rod 64. Thereafter, it is not uncommon for the mechanism to be inoperative for hours, or even days, weeks or months, such as in the case of vehicle storage or repair, for example. Under these conditions, a seal must be provided which gives a tight fluid seal, which also provides lubrication along the surface of the rod, but which utilizes the valve action just described to reduce sudden pressure build up on the one hand and slow gas or vapor leakage on the other hand.

In this connection, it will be noted that many oil seals are designed such that when the pressure in the cavity 78 becomes excessively high, the primary or fluid seal body 28 is urged radially inwardly because the cavity forces urging the seal radially inwardly exceed those urging i radially outwardly or away from the rod 64. While this is desirable within limits, because it insures a tight fluid seal, extreme pressures create such a tight sealing action that the rod surface is scraped dry of lubricant and the seal tends to fail because of high friction and heat. Thus, proper valve action can be made to control or eliminate excess pressure buildup in the area 78.

Referring now to FIG. 5, the seal is shown for illustrative purposes as being spaced radially inwardly from the surface 58 of the shell 54. This is done to illustrate that a seating bead 61 is provided adjacent the axially inner end of the rubber sleeve 34, such bead lying just outside an annular groove 63, which permits temporary deflection of the bead 61 while the seal is in the process of being seated.

Referring to FIGS. 1 and 2, and incidentally to FIG. 5, a preferred method of installing the seal may be understood. This comprises inserting the seal from the end of the sleeve 54 opposite the end flange 56 and allowing the seal 10 to be seated with its radial flange 24 engaging the inner end surface 62 of the flange 56. At this point, the bead 61 snaps into the cylinder groove 60, with any rubber deformation being accommodated by the seal groove 63. Thereafter, as the valve body 68 is inserted into position, either before, during, or after the rod 64 is inserted through the inside diameter of the seal 10, the groove 72 engages the radially inwardly directed surface 42 of the vapor lip 30, and as the body 68 is moved to its final position, the vapor lip body 30 is stretched and deformed radially outwardly, such as to the position shown in FIGS. 2 and 3, for example, where it remains under the bias or preload closing force referred to above.

In use, the seal operates as described, with the excluder lip body 32 acting to keep contaminants from the sealed region, the primary lip body 28 acting to confine fluid within the region 78, and the vapor lip providing the static vapor seal and one-way valve action referred to above. The construction of the vapor lip is such that it is simple to mold and is not overly sensitive to so-called "tolerance-stack-up" in assembly. In other words, it functions satisfactorily and reliably when installed within a relatively broad range of tolerances, considering the precision and cost of the seal and the sealed mechanism as a whole. Needless to say, this is very important in high volume production articles, including those intended for use in the automobile industry, for example.

It will thus be seen that the present invention provides a multi-function fluid seal for dampers and the like having a number of advantages and characteristics including those pointed out above and others which are inherent in the invention. A preferred embodiment of the invention having been described by way of illustration, it is anticipated that changes and modifications of the described fluid seal will occur to those skilled in the art and that such changes and modifications may be made without departing from the spirit of the invention or the scope of the appended claims.

I claim:

1. A fluid seal unit for use in retaining fluids within an associated sealed mechanism having first and second relatively movable parts defining at least one of a pair of fluid-receiving and retaining regions within said mechanism, said seal unit, and a first elastomeric seal body bonded to a portion of said casing unit, said first elastomeric seal body being of generally annular form, and having portions defining a primary fluid lip portion and a secondary excluder lip portion, with said primary lip portion having air and oil side frusto-conical surfaces meeting along a generally circular locus to define a seal band adapted to engage one of said first and second parts forming parts of said associated sealed mechanism in snug sealing engagement, said oil side frusto-conical surface being directed in part toward the first of said pair of fluid-retaining sealed regions within said mechanism, and a second, relief valve seal body also bonded to said casing unit at and being defined at least in part by a generally radially outwardly facing annular surface, an at least partially radially inwardly facing surface and a radially extending end face surface joined at its edges to axially inner margins of said outwardly and inwardly facing annular surfaces, said relief valve seal body being adapted to cooperate with a contoured relief valve seating surface forming a portion of said associated sealed mechanism, with said relief valve seal body surface and said seating surface being dimensioned so that said relief valve seal body surface is urged against said seating surface portion by the inherent resiliency of said relief valve seal body, said secondary excluder lip portion also including at least one annular surface adapted to define, in cooperation with one of said first and second movable parts of said sealed mechanism, a generally circular, radially inwardly acting excluder seal band.

2. A fluid seal unit as defined in claim 1 wherein said seating surface comprises as annular formation having a reduced diameter neck portion, an enlarged shoulder, and a rounded surface portion extending between said neck portion and said shoulder.

3. A fluid seal unit as defined in claim 1 wherein said casing unit includes an axially extending flange having an end portion extending toward the interior of said associated sealed mechanism, and wherein said relief valve lip body has a principal portion, including said end face surface thereof, which is unsupported by said flange and which also extends toward said interior of said associated sealed mechanism.

4. A fluid seal unit as defined in claim 1 wherein said primary fluid lip portion further includes a spring groove, and said seal unit includes a radially acting garter spring disposed within said spring groove.

5. A fluid seal unit as defined in claim 1 wherein said casing unit includes an axial flange and a radial flange, with said relief valve seal body having a part thereof bonded to each of said flanges and with said seal unit further including a rubber sleeve lying outside of and bonded to at least a portion of said axial flange of said casing.

6. A fluid seal unit as defined in claim 1 wherein said relief valve seal body is constructed and arranged such that its cross-sectional thickness decreases in the direction of said end face surface of said relief valve seal body.

7. A fluid seal unit as defined in claim 1 wherein said at least partially radially inwardly facing surface forming a part of said relief valve lip body includes an enlarged diameter portion forming an open end of said body, and a reduced diameter intermediate portion, with said relief valve seating surface having an end portion which is smaller in diameter than the diameter of said enlarged diameter end portion of said relief valve lip body, to facilitate placing said relief valve lip body in snugly overlying relation to said relief valve seating surface.

8. A fluid seal unit as defined in claim 1 which seal unit further includes a generally cylindrical elastomeric seal mounting sleeve bonded to and covering the outside diameter of at least a portion of said casing unit to provide an elastomeric seal mounting surface.

9. A fluid seal unit as defined in claim 8 wherein said elastomeric sleeve includes an annular locking bead having a portion extending radially outwardly of the outside diameter of said elastomeric seal mounting sleeve, said locking bead being adapted to engage a locking groove formed in a part of said associated sealed mechanism.

* * * * *

UNITED STATES PATENT AND TRADEMARK OFFICE
CERTIFICATE OF CORRECTION

PATENT NO. :  4,508,020
DATED     :  April 2, 1985
INVENTOR(S) :  Peter Szcupak

It is certified that error appears in the above-identified patent and that said Letters Patent are hereby corrected as shown below:

Column 6, Line 63
after "unit," insert

-- comprising, in combination, a relatively rigid casing unit--

Signed and Sealed this

Fifteenth Day of October 1985

[SEAL]

Attest:

*Attesting Officer*

DONALD J. QUIGG

*Commissioner of Patents and Trademarks—Designate*

UNITED STATES PATENT AND TRADEMARK OFFICE
CERTIFICATE OF CORRECTION

PATENT NO. : 4,508,020
DATED : April 2, 1985
INVENTOR(S) : Peter Szcupak

It is certified that error appears in the above-identified patent and that said Letters Patent is hereby corrected as shown below:

Claim 1, column 7, line 11, insert --"annular"-- between "facing" and "surface;

column 7, lines 17 to 18, delete --"surface"-- between "body" and "and";

column 7, line 19, delete --"surface"-- between "body" and "is".

Claim 3, column 7, line 37, delete "lip" and insert --"seal"--.

Claim 7, column 8, line 19, delete "lip" and insert --"seal"--;

UNITED STATES PATENT AND TRADEMARK OFFICE
CERTIFICATE OF CORRECTION

PATENT NO. : 4,508,020
DATED : April 2, 1985
INVENTOR(S) : Peter Szcupak

Page 2 of 2

It is certified that error appears in the above-identified patent and that said Letters Patent is hereby corrected as shown below:

Column 8, line 25, delete "lip" and insert --"seal"--.

Signed and Sealed this

Twenty-sixth Day of April, 1988

Attest:

DONALD J. QUIGG

*Attesting Officer*  *Commissioner of Patents and Trademarks*